United States Patent [19]

Circello et al.

[11] Patent Number: 5,131,086
[45] Date of Patent: Jul. 14, 1992

[54] METHOD AND SYSTEM FOR EXECUTING PIPELINED THREE OPERAND CONSTRUCT

[75] Inventors: Joseph C. Circello, Phoenix; Richard H. Duerden, Scottsdale; Roger W. Luce, Phoenix; Ralph H. Olson, Scottsdale, all of Ariz.

[73] Assignee: Edgcore Technology, Inc., Scottsdale, Ariz.

[21] Appl. No.: 539,381

[22] Filed: Jun. 15, 1990

Related U.S. Application Data

[63] Continuation of Ser. No. 236,646, Aug. 25, 1988, abandoned.

[51] Int. Cl.⁵ .................. G06F 9/22; G06F 9/26; G06F 9/302; G06F 9/305
[52] U.S. Cl. .................. 395/375; 364/231.8; 364/228.7; 364/262.4; 364/262.8; 364/263; 364/263.1; 364/263.3; 364/259; 364/DIG. 1
[58] Field of Search .................. 395/375, 650, 800

[56] References Cited

U.S. PATENT DOCUMENTS

| Re. 32,493 | 9/1987 | Matsumoto | 364/200 |
|---|---|---|---|
| 3,868,649 | 2/1975 | Sato et al. | 364/200 |
| 4,250,545 | 2/1981 | Blahut et al. | 395/375 |
| 4,251,859 | 2/1981 | Momose et al. | 395/375 |
| 4,287,561 | 9/1981 | Liptay | 364/200 |
| 4,442,498 | 4/1984 | Rosen | 364/745 |
| 4,467,444 | 8/1984 | Harmon, Jr. et al. | 364/900 |
| 4,468,736 | 8/1984 | DeSantis et al. | 364/200 |
| 4,569,016 | 2/1986 | Hao et al. | 364/200 |
| 4,594,655 | 6/1986 | Hao | 364/200 |
| 4,615,004 | 9/1986 | Chevillat | 364/200 |
| 4,620,277 | 10/1986 | Fisher | 364/200 |
| 4,626,989 | 12/1986 | Torii | 364/200 |
| 4,654,786 | 3/1987 | Cochran et al. | 364/200 |
| 4,683,549 | 7/1987 | Takaki | 364/900 |
| 4,697,233 | 9/1987 | Scheuneman | 364/200 |
| 4,760,544 | 7/1988 | Lamb | 364/736 |
| 4,766,566 | 8/1988 | Chuang | 364/900 |
| 4,777,594 | 10/1988 | Jones et al. | 364/200 |
| 4,858,105 | 8/1989 | Kuriyama | 364/200 |
| 4,901,225 | 2/1990 | Shiraishi | 395/375 |

FOREIGN PATENT DOCUMENTS

2126384 3/1984 United Kingdom.

Primary Examiner—Thomas C. Lee
Assistant Examiner—Daniel H. Pan
Attorney, Agent, or Firm—Cahill, Sutton & Thomas

[57] ABSTRACT

A system and technique for providing early decoding of complex instructions in a pipelined processor uses a programmed logic array to decode instruction segments and loads both the instruction bits and the associated predecoded bits into a FIFO buffer to accumulate a plurality of such entries. Meanwhile, an operand execute pipeline retrieves such entries from the FIFO buffer as needed, using the predecoded instruction bits to rapidly decode and execute the instructions at rates determined by the instructions themselves. Delays due to cache misses are substantially or entirely masked, as the instructions and associated predecoded bits are loaded into the FIFO buffer more rapidly than they are retrieved from it, except during cache misses. A method is described for increasing the effective speed of executing a three operand construct. Another method is disclosed for increasing the effective speed of executing a loop containing a branch instruction by scanning the predecoded bits in establishing a link between successive instructions.

10 Claims, 3 Drawing Sheets

METHOD AND SYSTEM FOR EXECUTING PIPELINED THREE OPERAND CONSTRUCT

This is a continuation of patent application Ser. No. 236,646, filed Aug. 25, 1988 now abandoned, by Joseph C. Circell, Richard H. Duerden, Roger W. Luce, and Ralph H. Olson, and entitled "PIPELINE STRUCTURES AND METHODS".

BACKGROUND OF THE INVENTION

The invention relates to structures and methods for decreasing the average instruction execution time for CISC (Complex Instruction Set Computer) type instructions in a pipelined architecture.

An approach to increasing computer system performance has been to design systems which execute so-called RISC (Reduced Instruction Set Computer) instruction sets rather than CISC (Complex Instruction Set Computer) instruction sets. In RISC instruction sets all instructions have the same length, and all use a so-called store-load architecture in which read and write operations from or to memory must be accomplished only with certain read and write instructions, whereas in CISC instruction sets it may be possible to include complex instructions that automatically effectuate certain read and write operations. Although RISC instruction sets at the present state of the art can be executed with Average Instruction Time (AIT) of only about 1.5 machine cycles per instruction, the "inflexibility" of RISC instruction sets often means that a much larger number of instructions must be included in a program to accomplish a particular task. In contrast, CISC instruction sets typically have an AIT of 10-15 machine cycles, but the number of CISC instructions required to accomplish a particular task may be far fewer than if RISC instructions are used. While each approach offers distinct advantages, at the present time it is unclear which approach will ultimately prevail. However, it is clear that it would be highly desirable if the AIT of executing CISC instructions could be substantially reduced, because the ease of programming with CISC instruction sets would be accompanied by the short AITs produced by RISC type architectures.

Pipelining techniques are well-known, wherein multiple stages of hardware, i.e., multiple pipelines, are provided so that each stage of the pipeline can be working on a different instruction at the same time, even though it may take as many machine cycles as there are stages in the pipeline to complete each instruction from start to finish. As long as the pipeline is kept full and operating smoothly, the AIT of each instruction will be much shorter than if pipelining techniques are not used. For CISC computer architectures, it has been impractical to have enough pipeline stages to shorten AITs of CISC instructions to much less than 10 machine cycles per instruction. In prior machines, the usual approach is to provide an instruction fetch pipeline which performs the functions of generating instruction addresses and loading the fetched instructions into an instruction buffer. The contents of the instruction buffer are read by an operand execution pipeline in which sequential microcode execution steps, each of which requires at least one machine cycle, are performed, resulting in typical AITs of 10-15 machines cycles for CISC type computers.

SUMMARY OF THE INVENTION

Accordingly, it is an object of the invention to provide a system and method for substantially reducing the average instruction execution time of complex instructions by a computer It is another object of the invention to provide a way of providing the ease of programming characteristic of CISC instruction sets with the short instruction execution times of RISC type instruction sets.

It is another object of the invention to provide a technique for increasing the effective speed of executing a three operand construct.

It is another object of the invention to provide a method for increasing the effective speed of executing a loop containing a branch instruction.

Briefly described, and in accordance with one embodiment thereof, the invention provides a system and technique for increasing the speed of execution of complex instructions in a pipelined processor including circuitry for decoding, preferably in a single machine cycle, a plurality of bits of an instruction to produce a plurality of associated predecoded bits and storing both the bits of the instruction and the predecoded bits in a FIFO buffer and repeating this procedure to accumulate instructions and their respective associated predecoded bits in the FIFO buffer. Meanwhile, an operand execute pipeline retrieves individual entries from the instruction buffer as needed, each entry including the bits of an instruction and the associated predecoded bits. The retrieving continues as long as entries are available from the FIFO buffer. The technique masks delays due to cache misses, substantially improving average instruction execution times. The technique also allows scanning of predecoded bits to enable the operand execution pipeline to execute the instructions fetched from the FIFO buffer much more rapidly than would otherwise be possible.

The invention also provides a method of increasing the effective speed of executing a three operand construct in a computer that requires two instructions to execute a three operand construct by predecoding first and second instructions that represent a three operand construct, wherein the first instruction is a move instruction to move the contents of a first location, which can be a memory or register contents, or immediate data, into a second location, which can be a register, and wherein the second instruction performs a predetermined operation, such as an add, subtract, shift, negate, or logic function, on the contents of a third location, which can be a register contents or immediate data, and puts the results of that operation into the second location. The results of the predecoding are "scanned" or examined to determine if the move instruction is linked to the second instruction, and if it is, the predetermined operation then is performed on the contents of the first and third locations, and the results are put into the second location without executing the move instruction.

In another embodiment of the invention, a method is provided for increasing the effective speed of executing a loop containing a branch instruction by writing first information into a branch cache to prevent aborting an instruction fetch pipeline on each pass through the loop. The branch cache has enough bits to contain the branch condition, the address of the immediately preceding instruction, and the address of a target instruction of the branch instruction. On every pass through the loop except the first pass, a branch cache hit is produced at the address of the preceding instruction. By evaluating the branch condition in the branch cache and simultaneously executing the target instruction, the loop is repeated without executing the branch instruction.

DETAILED DESCRIPTION OF THE PREFERRED EMBODIMENTS OF THE INVENTION

Instruction Fetch, Early Decode Pipeline

Figure 1:
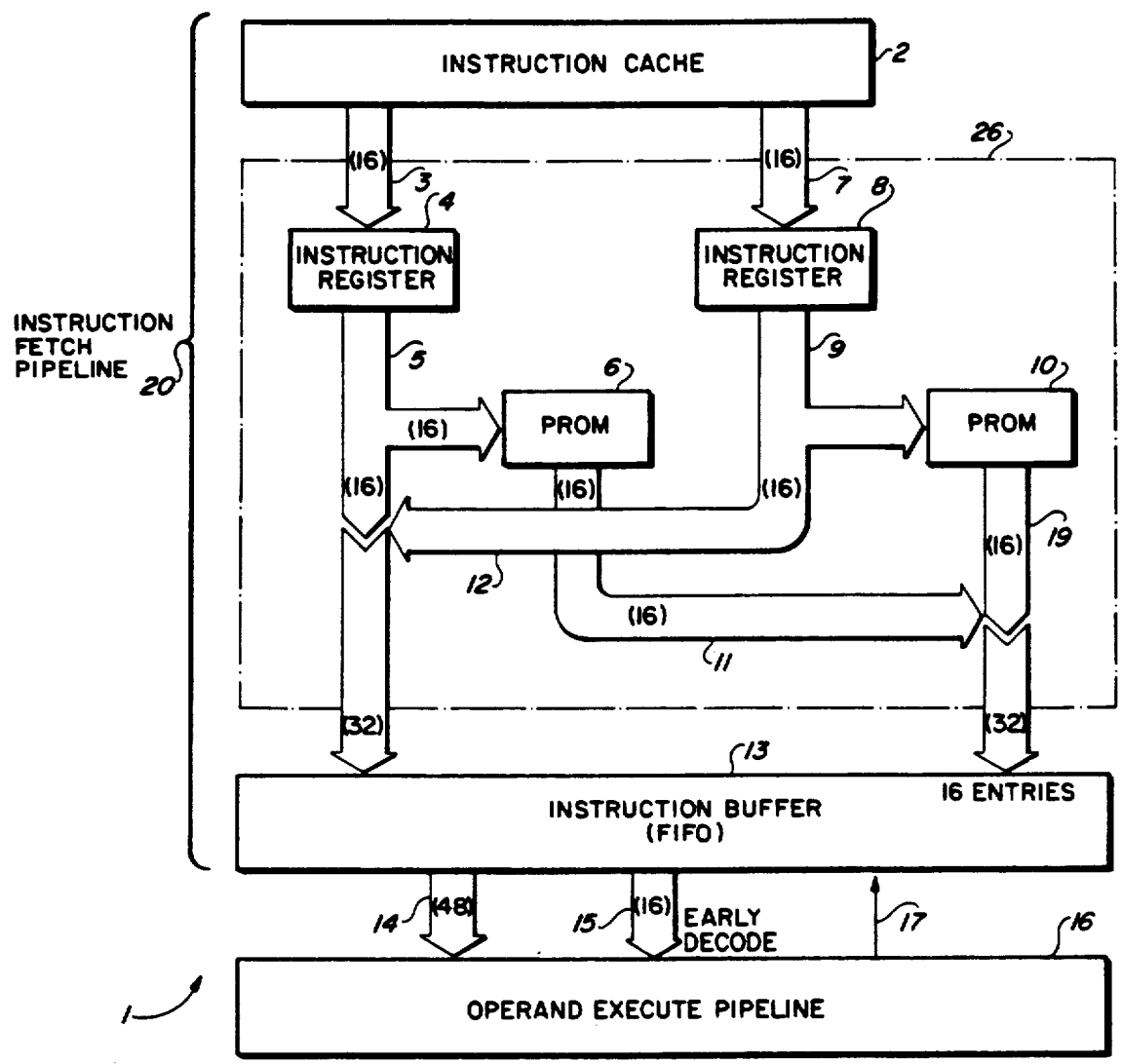
FIG. 1 is a schematic diagram illustrating the implementation of an early decode technique of an instruction fetch pipeline of a processor.

In FIG. 1 a portion 1 of a high performance computer system includes an instruction cache memory 2 which stores a large number of instructions previously loaded from a main "global memory" (not shown). The set of instructions in the instruction cache 2 includes the ones to be presently executed by an associated high speed operand execution pipeline 20 shown in FIG. 2. The instruction cache memory 2 is a very high speed memory, capable of operating at the same speed as a CPU 49 (FIG. 9), which operates many times faster than the much slower global memory 48.

Instruction cache 2 is 32 bits wide, and has 16 outputs designated by numeral 3 for loading a temporary instruction register 4 with 16 bits of an instruction. Sixteen lines 7 load a second temporary instruction register 8 with another 16 bits of that instruction.

The 16 output lines 5 of instruction register 4 are connected to inputs of an "elastic" FIFO (first in, first out) instruction buffer 13, in accordance with the present invention. The 16 lines 5 also are connected to address inputs of a PROM 6, which decodes the instruction bits on conductors 5 to produce 16 bits of "early decode" information on conductors 11, which also are connected to inputs of instruction buffer 13. Similarly, the 16 bits in instruction register 8 are applied to inputs of instruction buffer 13 and also to address inputs of PROM 10, which produces 16 more bits of early decode information on conductors 19.

The early decode information and the present embodiment of the invention includes five fields. The first three pertain to address generation, and include (1) a code to control address generation, (2) a code indicating the size of the operand, i.e., whether it is 8, 16, 32, or 64 bits, and (3) a code indicating whether the instruction makes no memory access, a read memory access, a write memory access, or a read/modify/write memory access. The two remaining fields control the sequence of the instruction decoding and controlling the instruction buffer 13. These fields include (4) a code indicating whether the instruction is 16, 32, or 48 bits in length and (5) a decode field that maps an original 16 bit op code to a 5 bit field to perform one level of decoding. This is done only for complex instructions requiring two or more machine cycles, for example an instruction in which access is needed to a variable number of registers.

By having the early decoded results, the operand execute pipeline 16 then need not perform the large number of sequential microcode execution steps as done in operand execute pipelines of prior CISC architecture machines, and instead can perform "hardware" decoding, typically by means of PAL (Programmed Array Logic) arrays that require only one machine cycle. These 16 bits of early decode information also are fed into instruction buffer 13, which is 64 bits wide. Each line of instructions in instruction cache 2 can include 16 bit instructions, 32 bit instructions, and 48 bit instructions.

Instruction cache 2, the instruction registers 4 and 8, and the early instruction decode PROMs 6 and 10 constitute an "instruction fetch pipeline" 20. The instruction buffer 13, which contains up to 16 entries, is "loosely" coupled to an operand execute pipeline circuitry 16.

Figure 2:
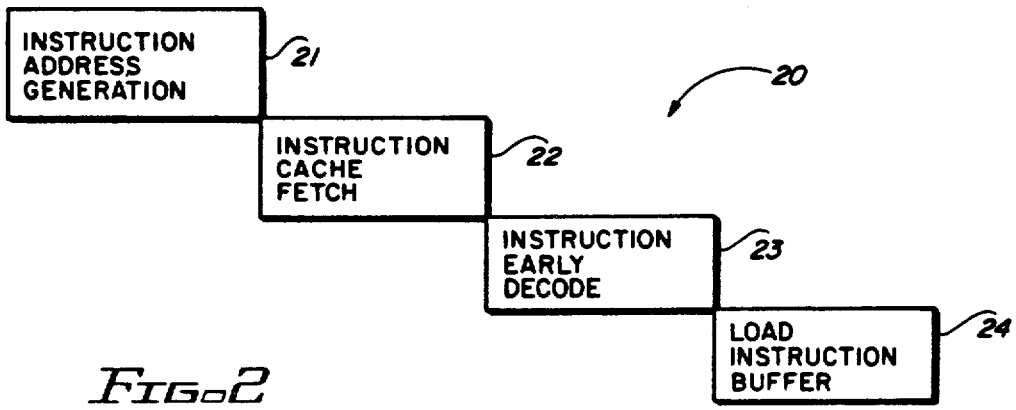
FIG. 2 is a diagram illustrating the instruction fetch pipeline in FIG. 1.

In FIG. 2 the four stages of the instruction fetch pipeline 20 are shown. Block 21 designates the step of generating addresses to be applied to the instruction cache 2. Block 22 designates accessing the instruction cache 2 to produce the outputs on conductors 3 and 7. Block 23 designates the instruction early decode function performed by PROMs 6 and 10 and loads the output of PROMs 6 and 10 into the instruction buffer 13, along with the undecoded instruction bits on conductors 5 and 9. Block 24 designates loading the instructions and associated predecoded bits into the operand execute pipeline 16.

Figure 5:
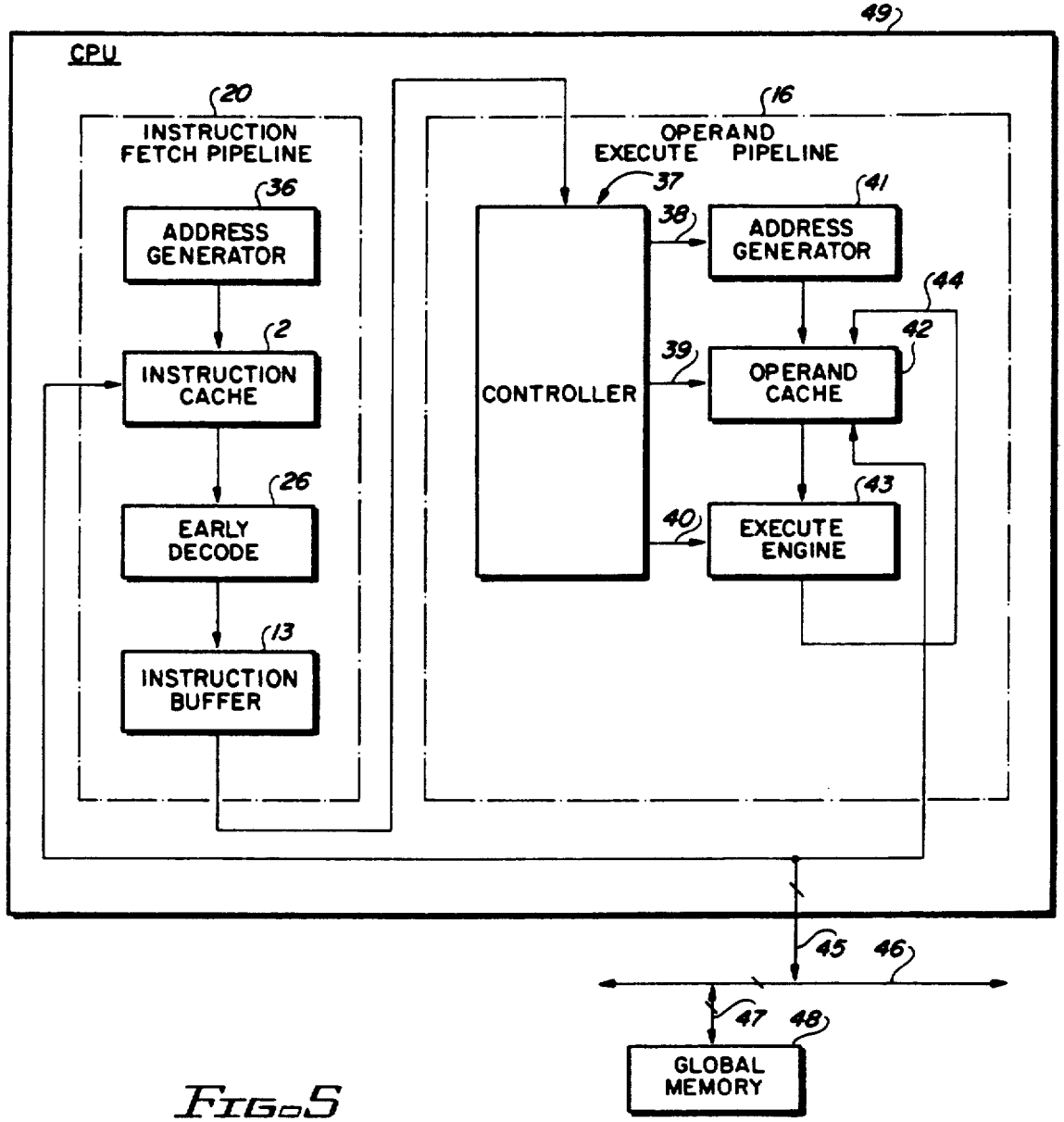
FIG. 5 is a block diagram illustrating the instruction fetch pipeline and operand execute pipeline in a CPU.

FIG. 5 shows how the early decode circuitry and other elements of the instruction fetch pipeline 20 and the elements of the operand execute pipeline 16 fit into a CPU 49.

In FIG. 5, the instruction fetch pipeline includes an address generator circuit 36 which addresses instruction cache 2. The contents of the instruction cache 2 are input to the early decode circuitry 26 described in FIG. 1. The output of the early decode section 26 is input to the instruction buffer 13 described above. The early decoded contents of instruction buffer 13 are fed into operand execute pipeline 16, and more specifically into a pipeline controller 37 thereof which is comprised of various timing and gating circuits needed to produce control signals 38, 39 and 40 which are output, respectively, to operand address generator 41, operand cache 42, and execute engine 43. The result produced by the execute engine 43 are connected by conductors 44 back to operand cache 42. Operand cache 42 also is connected by conductors 45 to a main bus 46, to which a global memory 48 is connected by means of conductors 47. Conductors 45 also connect operand cache 42 to instruction cache 2, as shown.

The instruction fetch pipeline 20 and the operand execute pipeline 16 are contained within a CPU (Central Processing Unit) 49. The operand execute pipeline 16 is conventional, and various implementation choices are readily available to those skilled in the art. It operates on the contents of the instruction buffer in the same general fashion as prior art operand execute pipelines.

In accordance with the invention, the instructions are "gated" out of the instruction buffer 13 at execution rates determined by the number of machine cycles needed to execute them. This allows operand execution pipeline 16 to execute instructions at its maximum rate as long as FIFO buffer 13 is not empty.

The early instruction decode information obtained from PROMs 6 and 10 allows the instructions to be executed more quickly in the operand execute pipeline 16 than the original instruction codes. In prior systems, ordinarily no instruction decoding is done in the instruction fetch pipeline. However, in accordance with the present invention, "early decoding" in the instruction fetch pipeline allows simplified subsequent decoding of very complex CISC (Complex Instruction Set Computer) instructions, the decoded results of which then can be more easily, rapidly executed in the operand execute pipeline 16 than if no such early decoding is performed. As a result of this aspect of the invention, the computer system containing it achieves execution of CISC instructions nearly as fast as industry averages for execution of RISC (Reduced Instruction Set Computer) systems, and also achieves the advantages of using powerful CISC instructions.

Note that every 16 bits of instruction information from the instruction cache is used to generate another 16 bits of early decode information for a 16 bit instruction, a 32 bit instruction, or 48 bit instruction. The operand execute pipeline 16 then can receive all of the decoded information needed to execute the present instruction in a single cycle, regardless of whether the present instruction is a 16 bit instruction, a 32 bit instruction, or a 48 bit instruction. For most instructions, the 16 bits of early decode information produced by the PROM is all that is needed for fast execution by the operand execute pipeline 16, without use of any of the original 16 bits of the instruction.

The techniques described herein, together with improved cache coherency techniques, use of an enlarged large operand cache and use of other improved cache techniques has been found to reduce the Average Instruction Time (AIT) down from the 10 to 12 machine cycles per instruction for typical CISC computers between 1.2 and 1.5 machine cycles per CISC type instruction. This is a dramatic decrease in execution instruction time for a CISC type machine. A major portion of this improvement is due to the early decoding technique.

The operand execution pipeline 16 gates instructions out of the instruction buffer 13, by providing a signal 17 indicating it has executed the current instruction, a signal indicating the length of the current instruction. It has been found in a present embodiment of the invention that the average instruction length executed in a single machine cycle clock time T is roughly 24 bits, and the instruction fetch pipeline fetches at an average rate of about 32 instruction bits per machine cycle T, so the instruction fetch pipeline can "get ahead" of the operand execute pipeline 16. Thus, the system described in FIGS. 1 and 2 usually fetches instructions at a faster rate than the rate at which instructions are being executed. The "ideal" average instruction execution time is degraded by delays caused by the instruction fetch pipeline and by delays caused by the operand execution pipeline. The primary factor causing such delays is cache misses in the instruction fetch pipeline.

Figure 3:
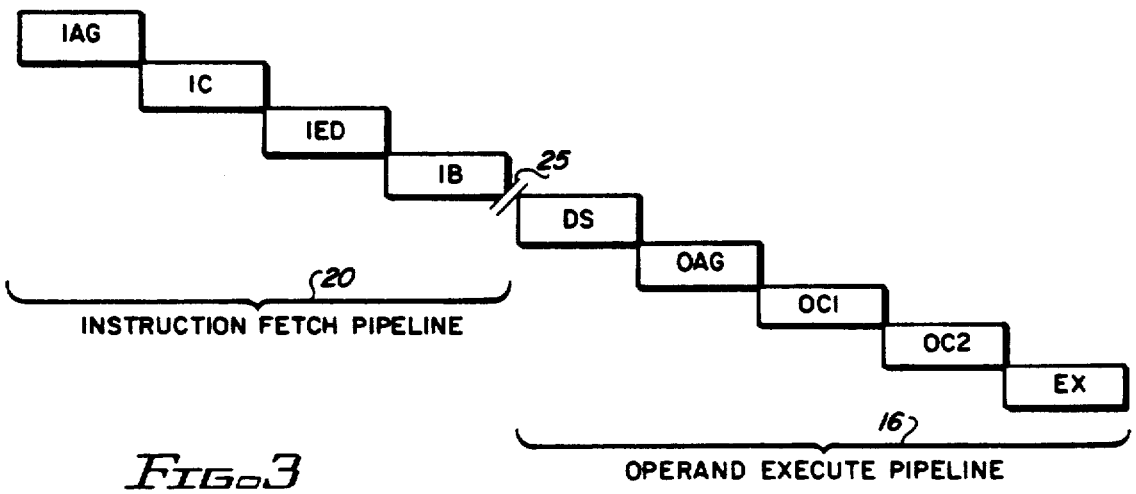
FIG. 3 is a diagram illustrating the relationship between the instruction fetch pipeline and the operand execute pipeline of FIG. 1.

The fact that the instruction fetch pipeline can "get ahead" of the operation execution pipeline 16 allows the system of FIGS. 1 and 2 to "hide" some of the cache miss time because the operand execute pipeline 16 can continue executing prefetched instructions during part or even all of a cache miss delay. In FIG. 3, numeral 25 represents the above described loose coupling of instruction fetch pipeline 20 to operand execute pipeline 16 effectuated by FIFO buffer 13, allowing instruction fetch pipeline 20 to get ahead of operand execute pipeline 16. A very substantial improvement in performance, i.e., instruction execution rate, is achieved.

Zero Time Move Instruction

Next, it will be convenient to describe a method of effectively achieving a "move" instruction in zero time as a result of the above described pipeline structure.

The fact that two consecutive 16 bit instructions are simultaneously loaded into the instruction registers 4 and 8, the outputs of which are simultaneously decoded by early instruction decode PROMs 6 and 10, makes it possible for the operand execute pipeline 16 to "scan"' 'or examine the output of instruction buffer 13 and determine if two instructions which normally would be executed on successive machine cycles are closely related.

Many CPUs, including the ones included in the computer system in which the present invention is utilized, are only capable of executing what are referred to as "2 operand constructs". A "construct" is a primitive statement in a computer program. CPUs that cannot perform "3 operand constructs" typically use 2 machine instructions to perform an operation using what are referred to as "2 operand constructs". For example, suppose the desired operation is to add the contents of location A to the contents of location B and put the results into location C. That is a 3 operand construct. Most CPUs need to carry out operation of such a 3 operand construct in the following fashion. First, a "move" instruction is executed that moves the contents of location A into location C. The CPU then would execute an add instruction that would add the contents of location B to location C and put the results back into location C, thereby "synthesizing" a 3 operand construct. However, the additional move instruction requires an extra machine cycle.

Because of the ability of the above described system 1 to perform the early decode function described above, as soon as the move instruction and the add instruction mentioned above are loaded into the operand execute pipeline 16, the machine also can immediately determine that the move instruction can be "linked" with the next add instruction. The system can then "collapse" the two instructions by simultaneously interpreting the early decode of the move and add instructions and, upon recognizing their relationship, using this information to apply the operand A to one input of an ordinary ALU, apply the operand B to the other input of the ALU, and obtain the sum A+B at the output of the ALU and write the sum into destination location C in a single machine cycle. The "move A" instruction associated with the add instruction therefore, in effect, becomes invisible. In other words, even though the instruction list includes a move instruction followed by an add instruction, the above described system allows the add function to be performed without waiting for the move instruction to be executed first. Note that this technique is equally applicable to subtract instructions, shift instructions, and other instructions that are normally included in programs as 3 operand constructs.

Zero Time Branch Instruction

Figure 4A:
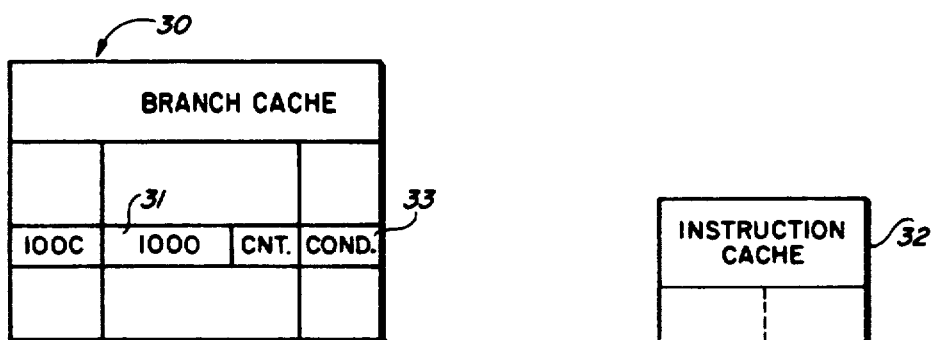
FIGS. 4A-4C are diagrams useful in illustrating the technique of executing a branch instruction with, in effect, zero time in a pipeline structure.

FIG. 4A shows a high speed branch cache memory 30 which is accessible by a high speed CPU (not shown). Reference numeral 31 designates a line of data in branch cache 1.

Approximately one fourth of all executed instructions in a computer typically are branch instructions. Therefore, the particular branch instruction methodology that a particular computer uses to handle branch instructions can have a very significant impact on overall computer performance. A branch cache is a cache memory that is located in an instruction fetch pipeline. A branch cache includes a table associating addresses of branch instructions with the addresses of their target instructions based on previous executions of the branch instructions. The branch cache contains "target" addresses to which a branch instruction points if the branch condition is met.

Branch instructions frequently are used in loops which are repeated many times until a certain condition is met. Following is an example of a loop containing a branch instruction:

| | |
|---|---|
| 1000 MOV A to B | (This is the beginning of a loop) |
| 1004 Add 1 to COUNT | |
| 1008 CMP COUNT and 900 | (Compare present value of COUNT to final value 900) |
| 100C BNE | (Branch to target address 1000 if COUNT is not equal to 900.) |
| 100E NEXT | (Next address in program instruction cache 2) |

A common procedure in a high performance computer is to use a branch cache which stores the association between the address of a "taken" branch instruction and the address of its target instruction.

Figure 4B:
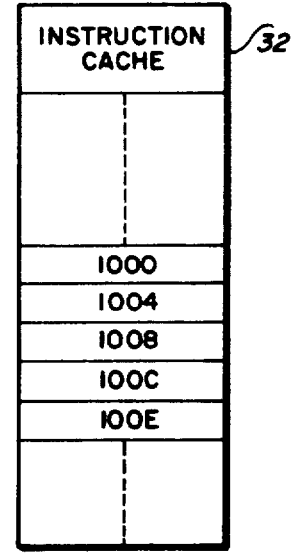
Figure 4C:
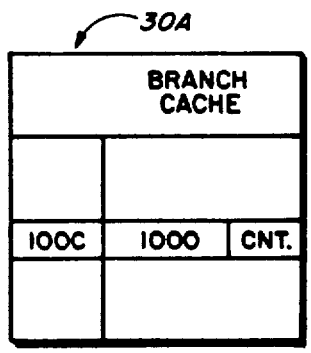

On a first pass through the above loop, executing the above instructions in a program which is stored in an instruction cache 32 of FIG. 4B, instructions 1000, 1004, 1008, and 100C are sequentially fetched in the instruction fetch pipeline 20 and passed to the operand execute pipeline 16. The condition of the BNE (Branch if Not Equal) instruction is not met if COUNT is equal to 900. Since COUNT is not equal to 900, the branch in this case is "taken", and this necessitates going back to target address 1000 in the instruction cache and aborting or cancelling the entire instruction and operand flow in both the instruction fetch pipeline 20 and the operand execute pipeline 16, which is very time-consuming. As the instruction fetch is reestablished at the target address 1000, the prior art branch cache shown in FIG. 4C is written with information associating the address of the branch instruction 100C and the address of the target instruction 1000 and a control field (CNT) indicating a "taken branch".

Then, the instruction fetch pipeline 20 can use that information in the branch cache 30A to "predict" changes in the instruction stream based on previous instruction executions. On the second pass through the loop, instruction fetch pipeline 20 will detect a "branch cache hit" at address 100C and send to the operand execute pipeline 16 a bit from the CNT field which indicates this is a branch that is "predicted" to be taken again on the basis of the prior pass. Additionally, the branch cache hit will cause the instruction fetch pipeline to discard the sequential fetching and begin fetching at the target address 1000.

In the above example of the prior art, on the second pass through the loop in the instruction cache 32, instructions 1000, 1004, 1008, and 100C are fetched, and at 100C the program takes a "branch cache hit". This causes the instruction fetch pipeline 20 to stop fetching instructions sequentially, and prevents aborting the instruction fetch stream and the operand execute pipeline stream and lets the program go back to the target address 1000 in the instruction cache 32. This is repeated, and a branch cache hit is taken on each pass through the loop until the 900th pass, with no time-consuming aborting of the instruction fetch and operand execute pipeline (until the 900th pass). This results in a substantial improvement in performance.

As an improvement over the foregoing, in accordance with the present invention, what has been done is to:

(1) write the information into the branch cache that prevents aborting the instruction fetch pipeline 20 and the operand execute pipeline 16 at the address of the instruction preceding the branch instruction, i.e., 1008 instead of 100C, (2) make the branch cache memory 30 somewhat "wider" than the prior art branch cache memory 30A (so it has more bits per line), and (3) write the branch condition into an extra field 33 provided in the widened branch cache. Then, on every pass through the loop (except the first pass), a branch cache hit is taken at the instruction preceding the branch instruction, i.e., at COMPARE instruction 1008 instead of BNE instruction 100C, so the loop is repeated many times, without ever fetching and executing the branch (BNE) instruction.

Stated differently, the "link instruction" that would normally be associated with the branch instruction BNE has been moved to the immediately prior instruction (which in this case is the compare instruction), and the branch instruction has effectively been eliminated from the loop for all except the first and last passes. In other words, the four instructions at addresses 1000, 1004, 1008 and 100C are effectively executed in three machine cycle times instead of four, resulting in a 25% improvement in performance over the prior art for all repetitions of the loop except the first and last. In a program with a lot of loops, this represents a very substantial improvement in overall system performance.

The following Table 1 indicates the flow of hexadecimal addresses 1000, 1004, 1008 and 100C, etc., in successive increments up to 28, with hexadecimal notation for the address increments in each entry except the first entry in each row, through each of the stages of the instruction fetch pipeline 20 and the operand execute pipeline 16. "X" shows where the pipelines are aborted or cancelled as the BNE instruction is evaluated on the first pass through the above loop. "*" indicates where branch cache hits occur at address 1008 as subsequent passes are made in accordance with the present invention, and the program returns to the target instruction 1000 without executing the BNE instruction. "!" indicates where to decode/select part of the operand execute pipeline 16 scans the predecoded results and "predicts" that the branch will be taken. "?" indicates where the branch condition retrieval from the branch cache is evaluated. The symbols "%" indicate the first, second, and third passes through the loop. It can be readily seen that the first pass takes a long time, due to aborting of instructions in the pipelines. From then on, each pass takes far less time due to the branch cache hits, as indicated by the intervals designated "2nd pass" and "3rd pass".

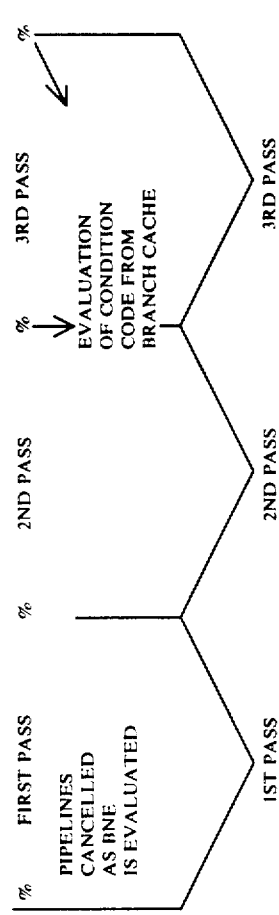

While the invention has been described with reference to a particular embodiment thereof, those skilled in the art will be able to make various modifications to the described embodiment without departing from the true spirit and scope of the invention.

What is claimed is:

1. A method of increasing the effective speed of executing a three operand construct, comprising the steps of:
   (a) predecoding first and second instructions which represent a three operand construct, the first instruction being a move instruction to move a first operand stored in a first location into a second location to thereby produce a second operand in the second location, and the second instruction performing a predetermined operation on the second operand and a third operand that is stored in a third location and putting results of the predetermined operation into the second location;
   (b) loading predecoding results of predecoding the first and second instructions into an operation execution pipeline;
   (c) determining, in response to the predecoding results of both the first and second instructions, if the move instruction is so linked to the second instruction as to define the three operand construct;
   (d) operating a single execute engine to perform the predetermined operation on the first and third operands if the move instruction is so linked to the second instruction as to define the three operand construct, and putting the results of the predetermined operation into the second location without executing the move instruction, thereby effectively collapsing the first and second instructions so they can be executed in a single machine cycle using a single execute engine.

2. The method of claim 1 wherein the second instruction is an add instruction.

3. The method of claim 1 wherein the second instruction is a subtract instruction.

4. The method of claim 1 wherein the second instruction is a shift instruction.

5. The method of claim 1 including performing step (a) in a single machine cycle in an instruction fetch pipeline, and performing steps (b) and (c) in an operand execution pipeline, the executing of step (d) being performed in a single machine cycle of the single execute engine.

6. In a pipelined processor, apparatus for increasing the effective speed of executing a three operand construct, comprising in combination:
   (a) means for predecoding first and second instructions which represent a three operand construct, the first instruction being a move instruction to move a first operand stored in a first location into a second location to thereby produce a second operand in the second location, and the second instruction performing a predetermined operation on the second operand and a third operand that is stored in a third location and putting results of the predetermined operation into the second location;
   (b) means for loading results of the predecoding into an operation execution pipeline;
   (c) means for determining, in response to the results of the predecoding, if the move instruction is so linked to the second instruction as to define the three operand construct;
   (d) means for operating a single execute engine to perform the predetermined operation on the first and third operands if the move instruction is so linked to the second instruction as to define the three operand construct and putting the results of the predetermined operation into the second location without executing the move instruction, thereby effectively collapsing the first and second instructions so they can be executed in a single machine cycle using the single execute engine.

7. The apparatus of claim 6 wherein the second instruction is an add instruction.

8. The apparatus of claim 6 wherein the second instruction is a subtract instruction.

9. The apparatus of claim 6 wherein the second instruction is a shift instruction.

10. The apparatus of claim 6 wherein the predecoding means is in an instruction fetch pipeline and the determining means is in a pipeline controller of an operand execution pipeline and the operation performing means includes an execute engine in the operand execute pipeline.

* * * * *